A. S. HUBBARD.
ELECTRICAL SYSTEM OF DISTRIBUTION.
APPLICATION FILED JUNE 9, 1906.
915,768.
Patented Mar. 23, 1909.
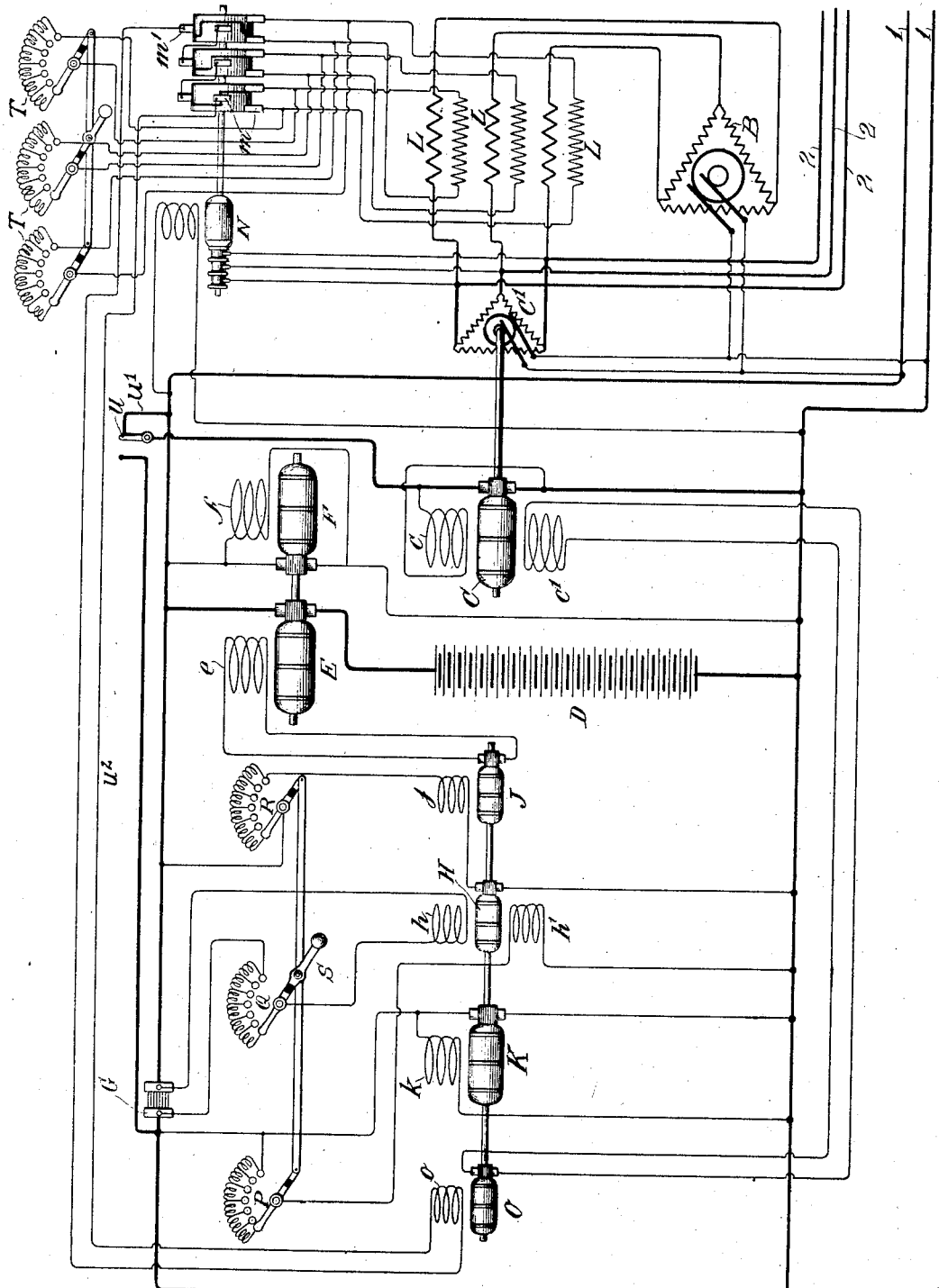

UNITED STATES PATENT OFFICE.

ALBERT S. HUBBARD, OF BELLEVILLE, NEW JERSEY, ASSIGNOR TO GOULD STORAGE BATTERY COMPANY, A CORPORATION OF NEW YORK.

ELECTRICAL SYSTEM OF DISTRIBUTION.

No. 915,768.      Specification of Letters Patent.      Patented March 23, 1909.

Application filed June 9, 1906. Serial No. 320,954.

*To all whom it may concern:*

Be it known that I, ALBERT S. HUBBARD, a citizen of the United States, and a resident of Belleville, Essex county, State of New Jersey, have invented certain new and useful Improvements in Electrical Systems of Distribution, of which the following is a specification.

My invention relates generally to electrical systems of distribution and especially to that class of system in which a storage battery is employed to steady the load on the generating system despite fluctuations of load in the working circuit or circuits.

My invention contemplates the employment of a storage battery in connection both with a direct current system of distribution and an alternating current system of distribution, the regulation being such that the battery can simultaneously compensate to steady the load on each of the generating plants, while, moreover, each generating plant may, independently of the battery, supply energy to the work circuits connected with the other generating plant when the distribution of load between the two systems makes this desirable. This tends to reduce the losses in the battery and the deterioration of the battery.

Between the alternating current and direct current sides of the system I employ a motor generator in which the energy may be transferred either from alternating current energy to direct current energy, or vice versa. In the direct current circuit is the usual battery and booster in series therewith acting as a source of auxiliary electro-motive force to vary the current flowing in the battery circuit. This booster I regulate in accordance with the variations of current on the direct current side of the system and, preferably, in accordance with the variations of the current strength of the direct current generating plant. The direct current end of the motor generator is regulated by means of various apparatus, hereinafter described, in accordance with changes in the alternating current circuit, and, preferably, in accordance with changes of current strength of the alternating current generating plant. By this arrangement any change of the direct current generator current causes the battery circuit to be affected to charge or discharge to limit the variations of the direct current generator, while any change of current strength of the alternating current generator plant will vary the electro-motive force produced at the direct current end of the motor generator and so cause a transference of energy from the direct current side of the system to the alternating current side or vice versa in order to limit the change of current on the alternating current plant. If opposite changes occur simultaneously on the two sides of the system, then the tendency would be for energy to be transferred from one generating plant to the other without substantially altering the current flow in the battery circuit. These results are obtained with the employment of only one booster and in a highly efficient manner.

Ordinarily the system operates in the general manner above set out but I also provide means, as another feature of my invention, to transfer the point at which the motor generator energy is taken or delivered to the direct current circuit from a point to one side of the part of the generating circuit employed for regulation of the booster to a point on the other side thereof. By this means I may, when the alternating current generator is shut down because the load on the alternating current work circuit is light or relatively steady, cause the alternating current load to be taken entirely by the direct current generator. This may be desirable for relieving the battery at times either when the alternating current generator is shut down or when it is in operation. Thus, if the alternating current generator is in operation and the direct current end of the motor generator or rectifying device is connected between the direct current generator and the regulating coil the fluctuations of load on the alternating current work circuit or such part of them as are felt in the direct current side of the system will fall upon the main generator and not upon the battery. By the same arrangement I am enabled when the direct current generator is shut down to regulate the booster by changes in the alternating current work circuit since with the apparatus so connected the current to or from the direct current end of the rectifying device would pass through the regulating coil.

Another feature of my invention resides in the regulating set which I have provided, comprising small regulating dynamos both for the booster and the direct current end of the motor generator controlled respectively by the two sides of the system and driven by the same motor.

Other features of my invention involve the various combinations and arrangements to more effectively and economically produce the desired regulation, as will more fully appear in the course of the following description.

The drawing accompanying this specification illustrates diagrammatically one embodiment of my invention.

A represents a direct current generator being merely typical of any direct current source of power. Thus it is immaterial whether this is a single main generator, or whether there are a number of these generators in parallel, or whether A represents only the direct current end or ends of one or more rotary converters at a substation. It is immaterial what type of generator may be employed and therefore I have not indicated the field windings thereof.

B indicates an alternating current generator and is here represented as generating three phase currents. Here, again, it is immaterial whether there is one or a number of alternating current generators at this point, and it is equally immaterial what particular type of alternating current generator is employed.

1 is a direct current work circuit supplying current to any type or types of direct current translating devices. This circuit may be of considerable length and may or may not be at a considerable distance from either the direct current generator A or the alternating current generator B or both.

2 represents an alternating current work circuit which also may be of considerable length and at any location relative to the generating plant or plants.

C, C' represent respectively, the direct current end and the alternating current end of a motor generator. The direct current end is connected to some part of the conductors leading from the generator A, while the alternating current end is connected to some part of the conductors leading from the generator B. The direct current end C of the motor generator is preferably a differentially wound machine having windings $c\ c'$ for purposes hereinafter set out. The alternating current end C' of the motor generator is preferably of the synchronous type in order that the motor generator may run at substantially synchronous speed. This motor generator is reversible in its transference of energy, that is, it may receive alternating current energy at C' and deliver direct current energy at C or receive direct current energy at C and deliver alternating current energy at C'. While I prefer a motor generator, and the more specific features of my invention include the provision of a motor generator at this point, yet the particular function of this motor generator is to transmit energy from one side of the system to the other and in this sense it is merely a rectifying device. So far as my particular invention is concerned, therefore, any rectifying device, by which I mean, a device which receives alternating or direct currents and gives out direct or alternating currents may be employed.

D is a storage battery which is connected in series with the armature E of a booster, the branch containing the battery and booster being connected across the direct current side of the system, being therefore in parallel with the work circuit with reference to the generator A and also in parallel with the motor generator with reference to the generator A. The booster armature E is driven by the armature F of a motor preferably connected to run at constant speed. This motor, in the present instance, is shown as a motor having a shunt winding $f$, the motor being connected across the direct current circuit, but it is immaterial whether this motor is a direct current or an alternating current motor. In the present instance the flow of current through the motor generator or rectifying device and the flow of energy through the battery circuit are regulated by the resultant effects of changes of current on the direct current side of the system and on the alternating current side of the system.

The primary effect produced by the changes in the direct current side of the system are obtained by the following apparatus. G indicates a fixed resistance as, for example, the well known Weston type of shunt, located in the system where it will receive the current passing from the main generator A. To the terminals of this shunt is connected a circuit which includes the field coil $h$ of a regulating dynamo. The current in this coil $h$ will therefore vary in accordance with the changes of current of the main generator. $h'$ is a coil connected across the circuit and preferably arranged so that its current acts oppositely upon the field magnet of the regulating dynamo to that of the current in the coil $h$. It will be understood, of course, that the resistance of the part of the circuit around which the coil $h$ is connected may be manually adjusted in ways well known to the art to adjust the system for different average loads on the main generator. The armature H of this regulating dynamo is connected in a separate branch across the direct current circuit, while in this branch in series with the armature H is the field coil $j$ of a regulating dynamo or exciter having the armature J. The armature H is, therefore, in the present instance, the armature of a counter machine whose electro-motive force is opposed to that of the system, the resultant of these opposing electro-motive forces acting upon the field $j$ of the exciter. The currents generated by the armature J flow through the field $e$ of the booster and determine the electro-motive force produced by the booster. The counter electro-motive machine and the exciter are preferably connected together mechanically and driven by the motor K, which is shown as having a shunt winding $k$ and is connected across the direct current system. This motor also drives another regulating dynamo hereinafter described.

The specific means for exciting the field of the booster in accordance with the variations of current on the direct current generator comprises the counter machine H and exciter J, as above described, as well as certain preferred features of design and construction of these machines not herein described, do not form a part of the present invention, being the subject matter of a separate application for Letters Patent which I am about to make, while some of the features of this apparatus have been set out in prior patents issued to me.

At L I have shown series transformers in the alternating current circuit, these being preferably located where their primaries will receive the current of the main alternating current generator B. These transformers are provided as part of the means for regulating in accordance with changes of current in the alternating current system, preferably the changes of current of the main generator thereof. The secondaries of these transformers have their terminals connected to the six brushes $m$ of a rectifying apparatus M, which, in the present instance, is shown as a commutator driven by a synchronous motor N connected across the alternating current system. A direct current circuit leads from the brushes $m'$ and this circuit is used for purposes of regulation. It will be understood that it is not material to my present invention what form of converting or rectifying apparatus is employed, or, indeed, so far as my invention in its broadest phase is concerned, it is not essential that a rectifying device for the regulating circuit should be provided, although I deem it preferable and have therefore shown apparatus employing such apparatus in the embodiment of my invention illustrated. The direct current in the circuit leading from the brushes $m'$ of the rectifying apparatus serves to excite the field $o$ of a regulating machine whose armature O is preferably driven by the motor K and in the present instance acts as an exciter to supply current to the field coil $c'$ of the direct current end of the motor generator or main rectifying device.

P, Q and R indicate three resistances connected respectively in the circuits of the field windings H', H and J. I have shown these three resistances connected mechanically together so as to be manually operated by the handle S. These serve to adjust the system for different values of regulation and form no part of my present invention. Similar manually operated resistances T are also shown connected across the alternating current regulating circuits and the same remarks may be made as to them.

At U I have shown a manually operated switch by means of which one branch of the armature C of the motor generator may be connected through the conductor U' to the direct current work circuit, which is the position of the switch shown in the drawing, or through the conductor $U^2$ to a point between the generator A and the shunt G.

In order to explain the operation of the system and the various apparatus I will assume that the generator A is giving a constant potential at all times regardless of the load upon the generator, it being, however, understood that the general operation of the system is not substantially different if generator A has a drooping or a rising characteristic.

In order to make clear the action of the apparatus, we will assume the switch U to be in the position shown and first assume the system with a load on the direct current work circuit 1 exactly equal to the average load desired on the generator A, and a load on the alternating current work circuit 2 exactly equal to the load desired on the alternating current generator B. It will be assumed also that it is desired that each generator shall vary only within small limits to each side of its desired average, the fluctuations in the work circuits and changes of condition of the battery being automatically compensated for by changes of current flow from the battery, or by transference of energy from the generator on one side of the system to the work circuit on the other side of the system, or by both. Under these assumptions the system will be so adjusted that the current in the direct current work circuit will be entirely provided by the direct current generator A and the current in the alternating current work circuit 2 will be entirely provided by the alternating generator B, while the regulating apparatus will be in the following condition. The current from the secondaries of the transformers L will be just sufficient to produce a field $o$ that will, through its action upon the armature O, produce a field strength, due to the coils $c$ and $c'$, just sufficient to cause the armature C to be run freely as a motor from the direct current circuit. The alternating current end C' of the motor generator will also be receiving sufficient current from the alternating current circuit to run it freely. Thus the work of rotating the motor generator will be divided equally between the two circuits. It will be understood that this assumes an ideal exactitude which will not be met with in practice, nor is it of any importance that the system should be adjusted with such ideal accuracy. Under these conditions, still assuming ideal accuracy, the current traversing the coil $h$ will be just sufficient so that the coils $h$ and $h'$ together will develop an electro-motive force in the armature H exactly equal to the voltage of the line. No current will therefore flow through the coil $j$ and no electro-motive force will be produced by the armature J so that the booster will be running idly. The battery D will be floating across the line neither charging nor discharging. If now there is an increase of current on the direct current work circuit without other change of the system, a small portion of the change will fall upon the generator A and this small portion acting upon the coil $h$ will cause the electro-motive force of the armature H to increase or decrease. This change of the electro-motive force of H will cause a current to flow in the proper direction from the coil $j$ thus producing a current from the armature J that will excite the booster field and produce a booster voltage in the proper direction to charge or discharge the batteries sufficiently to compensate for nearly all of the change that occurred in the working circuit. Every substantial change in the direct current working circuit will thus be compensated for, while, moreover, any change occurring at any moment in the battery condition, tending to vary the battery voltage and so to vary the current on the main generator, will also react through the coil $h$ and the apparatus governed thereby to compel the proper battery current to flow.

Assume next that with the current on the direct current work circuit that corresponds to the desired average on the generator A there should be a substantial change of current on the alternating current work circuit. The moment that a small portion of this change is felt in the transformers L the current through the regulating rectifier to the coil $o$ would be varied and this would cause a variation of current in the coil $c'$ of the direct current end of the motor generator. The apparatus being suitably designed, this change will be sufficient to vary the electro-motive force of the armature C and at once, according to whether this change is an increase or a decrease, cause energy to be transferred by the motor generator in one direction or the other to meet the change in the alternating current work circuit. Thus if the change in the alternating circuit is an increase, the end C' of the motor generator will generate current to assist the generator B, while the direct current side of the system will supply the proper energy to the motor generator for this purpose. This primary change caused by the alternating current changes acting upon the field strength of C will cause a secondary regulation of the battery, because the increased demand upon the direct current side of the system, will cause the current in the coil $h$ to change, as above described, and thereby vary the battery current in proper manner.

Assume now that both sides of the system change simultaneously and oppositely as, for example, should there be an increase of load on the alternating current work circuit occurring simultaneously with a decrease of load on the direct current work circuit. If we assume that these changes make the total load equal to the sum of the average loads of the two generators, less energy lost in the transformation, then the following distribution of currents would occur. The increase on the alternating current work circuit acting through the transformers L, the rectifier M, the dynamo O and the field $c'$ would cause the electro-motive force of C to decrease and transfer energy from the direct current system to the alternating current system. At the same time the decrease of current on the direct current work circuit would tend to cause current from the generator A to flow through the battery to charge it. The net result obviously is to leave the battery floating on the system and to supply the needed extra energy at the alternating current circuit directly from the direct current generator A through the motor generator.

It will be seen that all sorts of conditions of distribution of load may be present, but the general method of operation remains the same. According to the condition of the two work circuits and the state of charge of the battery, either generator may be supplying any portion of its energy to the other circuit either with or without assistance from the battery, or either generator may be acting to charge the battery and supply current to both work circuits. Putting it another way, either work circuit may receive its entire current from the generator of its side of the system, or it may also receive current from either the battery or from the generator on the other side of the system, or from both combined. Moreover, the flexibility of the system is such that either generator may be shut down entirely at certain periods or when an emergency arises, and the other generator, assisted by the battery, may supply both work circuits, automatic compensation being effectually obtained.

It will be noted that the regulation by the fluctuations in the alternating current side of the system affect the booster voltage just as those in the direct current side of the system affect that voltage. In the latter case the fluctuations either in the work circuit or in the condition of battery react to vary the generator current and this causes a regulation of the booster because of a change of current in the regulating coil $h$ placed in the generator circuit. In the former case the fluctuations in the alternating current side of the system act to regulate the transfer of energy through the motor generator, but in doing so the regulating coil $h$ is affected in the same way as by fluctuations initially occurring in the direct current side of the system. In this way a single booster having a single field winding is satisfactorily regulated responsively to changes arising on each side of the system.

At U is a switch arranged to connect the direct current end C of the rectifying device either with conductor U' or conductor $U^2$. If connected to U' the armature C is connected in series with the direct current work circuit so that changes of current in its armature will act indirectly upon the booster in the same manner as fluctuations of current in the direct current work circuit. If, however, the switch U connects the armature C with the conductor $U^2$, then fluctuations of current in the armature C will, if the main generator A is in service, act to vary the current in the main generator without affecting the current in the regulating coil $h$ so that these fluctuations will not be compensated for by the battery D. This will be advantageous at times when it may be desirable to relieve the battery of some fluctuations occurring on the system. Again, this arrangement may be desirable when there is a comparatively light or steady load upon the alternating current work circuit 2 and it is desired to shut down the main alternating current generator B. In this case the load on circuit 2 would simply be a continuous load on the main generator A, the armature C being the armature of the motor driving C' as the generator for the alternating current side of the system. Again, if the direct current generator A be shut down its connection to the armature C through the conductor $U^2$ will serve as a means of causing the current in the coil $h$ to be regulated by the current from the armature C, since in this case the alternating current end of the rectifying device would be the motor and the direct current end would be the generator for the direct current side of the system, and the booster would act to regulate the battery in accordance with variations of current on what has now become the main generator for the direct current side of the system.

It will be apparent that the various details of the apparatus may be very widely modified without departing from the scope of my invention, since various known methods of regulating batteries and dynamos are now known and employed. I have simply chosen what I have considered preferable apparatus for carrying out the various purposes which I have set out.

Having thus described my invention, what I claim as new and desire to protect by Letters Patent, is:

1. The combination of an alternating current generator, a direct current generator, a battery in parallel with the direct current generator, an auxiliary source of electromotive force in series with the battery, a rectifying device between the alternating current and direct current circuits, and independent means for regulating the auxiliary source of electro-motive force and the direct current end of the rectifying device, one of said means being controlled by variations in the direct current circuit and the other by variations in the alternating current circuit.

2. The combination of an alternating current generator, a direct current generator, a battery in parallel with the direct current generator, an auxiliary source of electromotive force in series with the battery, a rectifying device between the alternating current and direct current circuits, means for regulating the auxiliary source of electromotive force by variations of current in the direct current circuit, and means for regulating the electro-motive force of the direct current end of the rectifying device by variations of current in the alternating current circuit.

3. The combination of an alternating current generator, a direct current generator, a motor generator set between the same, a battery in parallel with the direct current generator, a booster in series with the battery, means for regulating the current in the booster field winding by variations of current in the direct current circuit and means for regulating the current in the field winding of the direct current end of the motor generator by variations of current in the alternating current circuit.

4. The combination of an alternating current generator, a direct current generator, a battery in parallel with the direct current generator, an auxiliary source of electromotive force in series with the battery, a rectifying device between the alternating current and direct current circuits, regulating apparatus for the auxiliary source of electromotive force, an independent regulating apparatus for the direct current end of the rectifying device, one regulating apparatus being governed by fluctuations of current strength of the direct current generator and one by the fluctuations of current strength of the alternating current generator.

5. The combination of an alternating current generator, a direct current generator, a battery in parallel with the direct current generator, an auxiliary source of electromotive force in series with the battery, a rectifying device between the alternating current and direct current circuits, means for regulating the auxiliary source of electromotive force by fluctuations of current strength of the direct current generator, and means for regulating the electro-motive force of the direct current end of the rectifying device by fluctuations of current strength of the alternating current generator.

6. The combination of an alternating current generator, a direct current generator, a motor generator set between the same, a battery in parallel with the direct current generator, a booster in series with the battery, means for regulating the current in the booster field winding by fluctuations of current strength of the direct current generator and means for regulating the current in the field winding of the direct current end of the motor generator by fluctuations of current strength of the alternating current generator.

7. The combination of an alternating current generator, a direct current generator, a battery in parallel with the direct current generator, an auxiliary source of electromotive force in series with the battery, a rectifying device between the alternating current and direct current circuits, independent means for regulating the auxiliary source of electro-motive force and the direct current end of the rectifying device, one of said means being controlled by variations in the direct current circuit and the other by variations in the alternating current circuit, a direct current work circuit in connection with the direct current generator, the battery and the rectifying device, and an alternating current work circuit in connection with the alternating current generator and the rectifying device.

8. The combination of an alternating current generator, a direct current generator, a battery in parallel with the direct current generator, an auxiliary source of electromotive force in series with the battery, a rectifying device between the alternating current and direct current circuits, means for regulating the auxiliary source of electromotive force by variations of current in the direct current circuit, means for regulating the electro-motive force of the direct current end of the rectifying device by variations of current in the alternating current circuit, a direct current work circuit in connection with the direct current generator, the battery and the rectifying device, and an alternating current work circuit in connection with the alternating current generator and the rectifying device.

9. The combination of an alternating current generator, a direct current generator, a motor generator set between the same, a battery in parallel with the direct current generator, a booster in series with the battery, means for regulating the current in the booster field winding by variations of current in the direct current circuit, and means for regulating the current in the field winding of the direct current end of the motor generator by variations of current in the alternating current circuit.

10. The combination of an alternating current generator and a circuit connected thereto, an alternating current work circuit, a direct current generator and a circuit connected thereto, a battery with its circuit and an auxiliary source of electro-motive force therein, a rectifying device having its alternating current end in parallel with the alternating current work circuit with relation to the alternating current generator circuit, and its direct current end in parallel with the direct current work circuit and the battery circuit in relation to the direct current generator circuit, regulating means for the auxiliary source of electro-motive force and independent means for regulating the electro-motive force of the direct current end of the rectifying device, said means being controlled one by changes in the alternating current generator circuit and one by changes in the direct current generator circuit.

11. The combination of a direct current generator, a storage battery, a booster in series with the battery, a motor generator, an alternating current generator, alternating current and direct current work circuits, the battery circuit, direct current work circuit and direct current end of the motor generator being in parallel with relation to the direct current generator circuit, while the alternating current work circuit and the alternating current end of the motor generator are in parallel with relation to the alternating current generator, and independent means for regulating the booster field strength and the field strength of the direct current end of the motor generator, one of said means being dependent upon changes in the alternating current generator circuit and the other upon changes in the direct current generator circuit.

12. The combination of a direct current generator, a storage battery, a booster in series with the battery, a motor generator, an alternating current generator, alternating current and direct current work circuits, the battery circuit, direct current work circuit and direct current end of the motor generator being in parallel with relation to the direct current generator circuit, while the alternating current work circuit and the alternating current end of the motor generator are in parallel with relation to the alternating generator, means for regulating the booster field strength by changes of current strength in the direct current generator circuit, and means for regulating the field strength of the direct current end of the motor generator by changes of current strength in the alternating current generator circuit.

13. The combination of a direct current generator, a battery in parallel therewith, an alternating current generator, a rectifying device, means for varying the current of said rectifying device in accordance with the needs of the system, and means for causing the varying current of the rectifying device to substantially vary the direct current generator current or the battery current as desired.

14. The combination of a direct current generator, a battery in parallel therewith, an alternating current generator, a motor generator, automatic means for varying the direction and amount of the electrical energy transferred by said motor generator according to the needs of the system, and means for causing the variations of said energy to substantially vary the direct current generator load or the direct current battery load as desired.

15. The combination of a direct current generator, a battery in parallel therewith, a booster in the battery circuit, a regulating coil in the generator circuit for varying the booster electro-motive force, an alternating current generator, a rectifying device between the alternating current and direct current circuits, means for varying the electrical energy transferred from one circuit to the other by the rectifying device, and a switch for connecting the direct current end of the rectifying device to either side of said regulating coil.

16. The combination of a direct current generator, a battery in parallel therewith, a booster in the battery circuit, an alternating current generator, a rectifying device between the alternating current and direct current circuits, and two regulating dynamos one regulating the booster field strength and itself controlled by variations of current strength in the direct current generator circuit, the other regulating the rectifying device and itself controlled by variations of current strength in the alternating current generator circuit.

17. The combination of a direct current generator, a battery in parallel therewith, a booster in the battery circuit, an alternating current generator, a motor generator between the alternating current and direct current circuits, and two regulating dynamos, one regulating the booster field strength and itself controlled by variations of current strength in the direct current generator circuit, the other regulating the field strength of the direct current end of the motor generator and itself controlled by variations of current strength in the alternating current generator circuit.

18. The combination of a direct current generator, a battery in parallel therewith, a booster in the battery circuit, an alternating current generator, a rectifying device between the alternating current and direct current circuits, two regulating dynamos, one regulating the booster field strength and itself controlled by variations of current strength in the direct current generator circuit, the other regulating the rectifying device and itself controlled by variations of current strength in the alternating current generator circuit, and a motor mechanically connected to both regulating dynamos.

19. The combination of a direct current generator, a battery in parallel therewith, a booster in the battery circuit, an alternating current generator, a motor generator between the alternating current and direct current circuits, two regulating dynamos one regulating the booster field strength and itself controlled by variations of current strength in the direct current generator circuit, the other regulating the field strength of the direct current end of the motor generator and itself controlled by variations of current strength in the alternating current generator circuit, and a motor mechanically connected to both regulating dynamos.

20. In an electrical system of distribution having a direct current generator, battery and booster, an alternating current generator, and a motor generator connecting the alternating current and direct current sides of the system, of a regulating apparatus comprising a motor and two exciting dynamos driven thereby and respectively exciting the booster and motor generator and responsive to fluctuations in the opposite sides of the system.

21. The combination of a direct current generator, a battery in parallel therewith, an alternating current generator, a rectifying device between the alternating current and direct current circuits, a regulating coil in the circuit of the direct current generator for varying the battery current, and means for causing said coil to be responsive to changes of current in the direct current end of the rectifying device when the direct current generator is out of circuit.

22. The combination of a direct current generator, a battery in parallel therewith, an alternating current generator, a rectifying device between the alternating current and direct current circuits, a regulating coil for varying the battery current, and circuits and connections for causing said coil to be either in the circuit of the direct current generator or in a circuit receiving the algebraic sum of the currents of the direct current generator and direct current end of the rectifying device, or when the direct current generator is out of action, in the circuit of the direct current end of the rectifying device.

23. The combination of a direct current generator and work circuit, an alternating current generator and work circuit, a rectifying device between the alternating current and direct current sides of the system, a regulating battery in a branch across the direct current circuit, a booster in the battery branch and means for regulating the booster voltage responsively to fluctuations on the direct current side of the system and for modifying the direct current fluctuations responsively to fluctuations on the alternating current side of the system.

24. The combination of a direct current generator and work circuit, an alternating current generator and work circuit, a rectifying device between the alternating current and direct current sides of the system, a regulating battery in a branch across the direct current circuit, a booster in the battery branch, a field-winding for the booster, and means for varying the current therein responsively to fluctuations on the direct current side of the system and for modifying the direct current fluctuations responsively to fluctuations on the alternating current side of the system.

25. The combination of alternating current generator and work circuit, a rectifying device connected thereto, a battery and battery booster in series connected to the direct current end of the rectifying device, means for regulating the transfer of energy by said rectifying device, said means being responsive to changes on the alternating current side of the system, and means for regulating the booster voltage responsive to the changes of current in the direct current end of the rectifying device.

26. The combination of an alternating current generator, a direct current generator, a storage apparatus in parallel with the direct current generator, an auxiliary source of electro-motive force in series with the battery, a rectifying device between the alternating current and direct current circuits, means controlled by variations in the direct current circuit in operative relation to said auxiliary source of electro-motive force for regulating the same, and means controlled by variations in the alternating current circuit in operative relation with the said rectifying device to regulate the ratio between the direct current and alternating current electro-motive forces thereof.

27. The combination of an alternating current generator, a direct current generator, a storage apparatus in parallel with the direct current generator, an auxiliary source of electro-motive force in series with the battery, a rectifying device between the alternating current and direct current circuits, a coil in the direct current circuit in operative relation to said auxiliary source of electro-motive force for regulating the same, and a coil in the alternating current circuit in operative relation with the said rectifying device to regulate the ratio between the direct current and alternating current electro-motive forces thereof.

28. The combination of an alternating current generator, a direct current generator, a storage battery connected in parallel to the direct current generator, a booster in the battery circuit, a rectifying device between the alternating current and direct current circuits, a coil in the direct current circuit subject to the fluctuations therein, regulating apparatus governed thereby and in operative relation with the field magnet of said booster, a coil in the alternating current circuit, and regulating apparatus governed by said coil and operatively related to said rectifying device to regulate the ratio between the alternating current and direct current electro-motive forces of the rectifying device.

In testimony whereof, I have signed my name to this specification, in the presence of two subscribing witnesses.

ALBERT S. HUBBARD.

Witnesses:
EDWIN SEGER,
ANNA DALY.

---

Correction in Letters Patent No. 915,768.

It is hereby certified that in Letters Patent No. 915,768, granted March 23, 1909, upon the application of Albert S. Hubbard, of Belleville, New Jersey, for an improvement in "Electrical Systems of Distribution," an error appears in the printed specification requiring correction, as follows: In line 86, page 1, after the word "desirable" the word *also* should be inserted; and that the said Letters Patent should be read with this correction therein that the same may conform to the record of the case in the Patent Office.

Signed and sealed this 20th day of April, A. D., 1909.

[SEAL.]

C. C. BILLINGS,
*Acting Commissioner of Patents.*